(12) United States Patent
Buchstaller

(10) Patent No.: US 11,053,657 B2
(45) Date of Patent: Jul. 6, 2021

(54) MANHOLE ELEMENT

(71) Applicant: Jürgen Buchstaller, Nuremberg (DE)

(72) Inventor: Jürgen Buchstaller, Nuremberg (DE)

( * ) Notice: Subject to any disclaimer, the term of this patent is extended or adjusted under 35 U.S.C. 154(b) by 1 day.

(21) Appl. No.: 16/082,903

(22) PCT Filed: Mar. 8, 2017

(86) PCT No.: PCT/EP2017/055488
§ 371 (c)(1),
(2) Date: Sep. 6, 2018

(87) PCT Pub. No.: WO2017/153496
PCT Pub. Date: Sep. 14, 2017

(65) Prior Publication Data
US 2019/0093308 A1    Mar. 28, 2019

(30) Foreign Application Priority Data

Mar. 9, 2016   (DE) .......................... 102016104333.8

(51) Int. Cl.
*E02D 29/12* (2006.01)
*H04Q 9/00* (2006.01)
*G08C 17/00* (2006.01)

(52) U.S. Cl.
CPC .............. *E02D 29/12* (2013.01); *H04Q 9/00* (2013.01); *E02D 2300/002* (2013.01); *E02D 2300/0006* (2013.01); *E02D 2300/0026* (2013.01); *E02D 2600/10* (2013.01); *G08C 17/00* (2013.01)

(58) Field of Classification Search
CPC ...... E02D 29/12; E02D 2600/10; G08C 17/00
See application file for complete search history.

(56) References Cited

U.S. PATENT DOCUMENTS 5,608,171 A * 3/1997 Hunter .................... G01F 1/363
                                                          73/215
8,077,101 B1 * 12/2011 Mastarone, Jr. ......... H01Q 1/04
                                                          343/719
(Continued)

FOREIGN PATENT DOCUMENTS

DE          29914656 U1   12/1999
DE       102012013618 B3    9/2013
JP          2000-121740  *  4/2000
(Continued)

OTHER PUBLICATIONS

Machine Translation of Japanese document JP 2000121740, 4 pages. (Year: 2000).*

(Continued)

*Primary Examiner* — Sunil Singh
(74) *Attorney, Agent, or Firm* — Rimôn, P.C.

(57) ABSTRACT

The invention relates to a manhole element (a shaft element) (1) for forming at least a portion of a manhole structure (a shaft structure) (2), which manhole element is comprised of a base body (3) delimiting a hollow space; wherein at least one detection device (4), which is designed to detect and determine at least one "detection variable", as well as an associated transmission device (5), which is designed to transmit the "detection variables" acquired by the detection device (4) to at least one communication partner, are integrated into the base body (3).

9 Claims, 3 Drawing Sheets

(56) References Cited

U.S. PATENT DOCUMENTS

Figure 1:
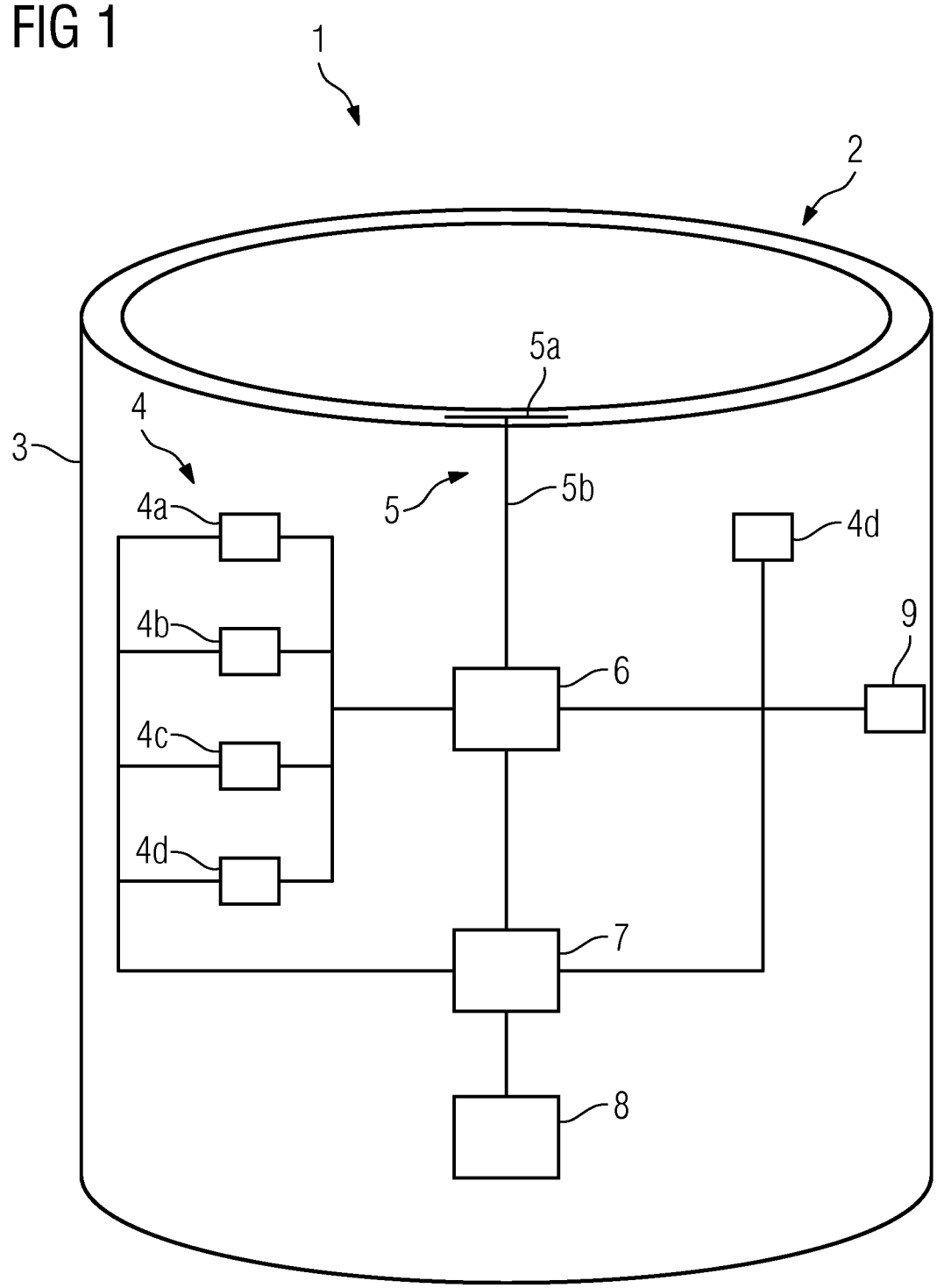

2008/0074254 A1 3/2008 Townsend et al.
2014/0030026 A1* 1/2014 Kiest, Jr. ............... E02D 29/128
405/184.2

FOREIGN PATENT DOCUMENTS

| JP | 2004-364436 | * | 12/2004 |
| JP | 2015-12431 | * | 1/2015 |
| KR | 2003-0054212 | * | 7/2003 |

OTHER PUBLICATIONS

Machine Translation of Japanese document JP 2004364436, 14 pages (Year: 2004).*
Machine Translation KR 20030054212 (Year: 2003).*
Machine Translation JP 2015-12431 (Year: 2015).*

* cited by examiner

MANHOLE ELEMENT

CROSS-REFERENCE TO RELATED APPLICATIONS

This application is a U.S. national stage entry of International Application serial no. PCT/EP2017/055488 filed Mar. 8, 2017 under 35 U.S.C. § 371, which claims priority to German Patent Application serial no. 102016104333.8 filed Mar. 9, 2016. The contents of these applications are incorporated herein by reference in their entirety.

The invention relates to a manhole element (a shaft element) for forming at least a portion of a manhole structure (a shaft structure), which manhole element is comprised of a base body delimiting a hollow space.

Manhole elements of this general type, for formation of manhole structures which, e.g., form a part of a shaft system for disposal or supply of materials, e.g. for disposal of sewerage and/or wastewater and/or runoff water, are basically known.

It is also known that the transmission (sending and receiving) of communication signals through manhole elements and manhole structures of these general types can be attended with problems. This is particularly true of manhole elements and manhole structures disposed below ground level. A particular known problem concerns transmission of communication signals between a signal source disposed below ground level and a signal receiver disposed above ground level (or vice versa); the communication signals must be transmitted here through a manhole structure and the manhole elements of which the manhole structure is comprised.

The signal sources contemplated typically comprise separate (not structurally connected to the manhole structure) transmitting and/or receiving devices which are exposed to the environmental conditions which prevail at and in the given manhole structure.

The object of the invention is to devise a manhole element which is improved over known manhole elements.

This object is achieved in particular by a manhole element according to the claims. The dependent claims relate to particular embodiments of the described manhole elements.

The manhole element described herein is used in general for forming manhole structures. The manhole structure may generally be disposed or formed at least partly below (or above) ground level. The manhole structure may form part of, e.g., a shaft system employed for disposal or supply of materials, wherein at least part of the system is disposed below ground level (or above ground level). An example of a shaft system of this general type which is disposed below ground level is a manhole structure for disposal of sewerage and/or wastewater and/or runoff water.

The manhole element is comprised of a base body (hereinafter "the base body") which delimits a hollow space. The basic geometric shape of the base body may be (but is not necessarily) that of a hollow cylinder; other geometric shapes of the base body are also conceivable, e.g. basic angular geometric shapes (e.g. polygonal).

Depending on the function and the structural design of the manhole element, the base body may be comprised of, e.g., various structural and other materials, in particular materials chosen from the groups comprising metals, ceramics, and plastics. Preferably, the base body may be comprised of a structural material which optionally may be curable and/or pourable, e.g. concrete. Particularly preferably, the base body may be comprised of an extrudable or injection-moldable plastic material, e.g. a polyolefin such as PA, PC, PE, PP, or PS, and may be a thermoplastic material. Self-evidently, the base body may be comprised of various parts or sections which may have different compositions.

The base body of the manhole element has integrated into it a detection device and a corresponding transmission device which is coupled to said detection device for purposes of data transmission. The term "integrated" should be understood to mean that the device (the detection device and the transmission device, respectively) is structurally connected to the base body. The detection device and the transmission device are disposed or formed in a wall of the base body of the manhole element, at least partially, and typically completely. The structural connection may or may not be releasable, and if releasable the releasing may or may not result in damage to or destruction of [components]. In the "first case", the detection device and/or components associated with it, e.g. detection elements, and/or the transmission device and/or components associated with it, e.g. transmission elements, may be (immediately) surrounded by the material of which the base body is comprised; thus, e.g., the detection device and/or the transmission device can be surrounded by (encapsulated in) said material of the base body due to pouring of said material around these devices when the base body is fabricated. In the "second case", the detection device and/or its associated elements, and the transmission device and/or its associated elements, are disposed in (or formed in) accommodation spaces provided for the purpose in (or associated with) the base body, in particular in each instance in an exposed or exposable, thus accessible, space in the base body, such spaces being comprised of recesses. For the example of a base body having the basic shape of a hollow cylinder, accommodation spaces may be disposed (or formed), e.g., in the region of an outer and/or inner peripheral surface, and/or in the region of an annular or specially shaped end face. Such an accommodation space may be (reversibly) closed off by, e.g., a swingable closure element associated with said space. When in the closed state, the devices accommodated in the respective accommodation spaces are protected from external influences; in the open state, the devices accommodated in the respective accommodation spaces can be accessed.

The detection device is adapted to detect (and possibly record the value of) at least one "detection variable". A "detection variable" acquired and determined by the detection device may comprise a chemical and/or physical quantity, e.g. the composition of the atmosphere, the density, the pressure, the humidity, the pH, the temperature, etc., of:
  the manhole element; and/or
  a (fluid) medium disposed (and possibly flowing) in the hollow space delimited by the base body, or in the manhole structure which accommodates the manhole element. Useful chemical and/or physical quantities (parameters) may be determined in particular with respect to a (fluid) medium disposed (and possibly flowing) in the hollow space delimited by the base body, which medium may comprise sewage, wastewater, runoff water, a gas, etc. For a (fluid) medium flowing in the hollow space delimited by the base body, the sensor system may (also) determine flow parameters, such as the flow rate and/or flow speed. A "detection variable" acquired and determined by the detection device may comprise a level (e.g. a water level) in the hollow space delimited by the base body, or in the manhole structure which accommodates the manhole element. Such a level may be the level of a (fluid) medium disposed in the hollow space delimited by the base body, which level may vary upward and downward. In sum: The detection device can be designed and adapted to detect and determine a "detection variable" describing at least one chemical and/or physical parameter, in particular atmosphere, density, pressure, humidity, pH, and/or temperature, of the shaft element and/or of a medium flowing within the hollow space delimited by the base body, and/or a "detection variable" describing a flow parameter of a medium flowing within the hollow space delimited by the base body, and/or a "detection variable" describing a level of a medium flowing within the hollow space delimited by the base body.

To detect and determine the various "detection variables", the detection device typically comprises a plurality of "detection elements" suited to the purpose, e.g. which "detection elements" are in the nature of measuring probes or sensor-like devices. The "detection elements" may detect and determine various "detection variables", such as e.g. acoustic, electrical, electromagnetic, or optical parameters. Thus, a "detection element" may comprise, e.g., an acoustic sensor (such as an ultrasound sensor, an electrical sensor (such as a capacitive sensor), an electromagnetic sensor (e.g. an inductive sensor), or an optical sensor (such as a camera, in particular a CCD camera or infrared camera). The preceding list of possible "detection elements" is not exhaustive. It is self-evident that a given "detection variable" may be detected and determined by "detection elements" which are of different types and/or which have different characteristics. In this way it is possible to increase the reliability (statistical accuracy) of the "detection variables" detected and determined by means of various "detection elements".

The transmission device is designed to transmit "detection variables" detected and determined by the detection device, to at least one communication partner, the transmission being generally in the form of communication signals, e.g. comprising data. A "communication partner" may be a different (mobile or stationary) transmission device, e.g. comprising a mobile telephone, smart phone, tablet computer, laptop computer, etc., and/or a global or local data network or transmission network (e.g. intranet or Internet). Typically the transmission device is also designed to receive communication signals transmitted from at least one communication partner. A suitably configured transmission device may be designated as (and considered as) a "sending device" and/or a "receiving device".

The transmission device comprises transmission elements (i.e. transmitting and/or receiving elements) which are adapted for transmission (i.e. sending and receiving) of communication signals. A free end of a transmission element can extend out of an exposed region, in particular an exposed end face region, of the base body. Via a suitable free end, the transmission element can transmit communication signals to a communication partner or can be connected to another transmission element.

The means of transmission of the various communication signals via a transmission element may be essentially wired or wireless; wireless transmission means which may be considered are basically any wireless transmission means, according to various standards and protocols, examples of which are (mentioned merely for purposes of example) Bluetooth, GSM, DECT, and sub-gigahertz transmission means, modes, standards, and protocols. The communications bands employed for the transmission may comprise so-called "licensed bands" or "unlicensed bands", particularly any of the ISM bands (Industrial, Scientific and Medical Bands). ISM bands employed may be bands used also for audio data and/or video data.

For wireless transmission, the transmission device will comprise at least one wireless transmission element, in particular an antenna element. The wireless transmission element will typically comprise an elongated electrically conductive structural element which at least partially extends inside ("through") the base body. A plurality of wireless transmission elements may be provided which extend at mutual angles, particularly parallel, with respect to an axis (e.g. the central axis) of the base body, which thereby may result in a two-dimensional arrangement. A plurality of wireless transmission elements may be provided which have at least one crossing point, where transmission elements mutually cross; which may result in a two-dimensional arrangement. e.g. a lattice arrangement. Particular desired sending characteristics (and possibly receiving characteristics) of the transmission device may be achieved by appropriate dimensioning and arrangement, of the various wireless transmission elements.

The described integration of a detection device and a transmission device results in an improved manhole element.

The detection device may have associated with it an evaluation device, which may be suitably integrated into the detection device, the transmission device, and the base body. The evaluation device is designed to evaluate the "detection variables" detected and determined by the detection device system, with regard to at least one evaluation criterion. For this purpose, the evaluation device is comprised of evaluation algorithms programmed with regard to respective evaluation criteria. Such an evaluation criterion may enable evaluation of "detection variables" which have been detected or determined, for the purposes of a given shaft (manhole). The evaluation of "detection variables" which have been detected or determined is generally in the context of specific characteristics of the manhole structure or specific characteristics of a (fluid) medium disposed in the manhole structure. E.g., the chemical composition, density, pressure, temperature, etc., of a (fluid) medium disposed and/or flowing in the hollow space can be evaluated with regard to certain limit values. It is also conceivable that an evaluation will involve qualitative or quantitative evaluation of the presence of certain chemical substances, e.g. as to whether parameters are greater than or less than certain limit values, and in particular whether the liquid level is greater than or less than a certain limit value.

On the other hand, a particular evaluation criterion may enable evaluation of "detection variables" which have been determined, which evaluation is not in the specific context of a given shaft (manhole). Such an evaluation may consist of evaluating "detection variables" which have been detected or determined, with regard to specific characteristics in the region around the manhole structure. E.g. determinations may be made with respect to an object disposed (directly) above the manhole element, by means of "detection elements" associated with the detection device and advantageously distributed around the periphery of the base body, which "detection elements" may comprise elements which determine strain, or pressure, reflecting the fact that the weight of an object (assuming a certain minimum weight) will bring about a special distribution of forces in the manhole element, e.g. pressure forces, i.e. said weight will have special effects on particular ratios of forces, e.g. certain pressure forces, in the manhole element. Similarly, movements and movement profiles of an object, relative to the manhole element, can be determined, e.g. in relation to location parameters, in particular direction-dependent, and/or time-dependent, for various locations.

As a concrete example, traffic flow above the manhole element can be determined, e.g. in relation to location parameters, in particular direction-dependent, and/or time-dependent, for various locations, in relation to specific traffic engineering parameters, e.g. particular road users, (average) traffic density, (average) traffic speed, etc., and in relation to criteria and standards applicable to these parameters. Further, the determinations can be accomplished in a short period of time. If the manhole element is located in the area of an entrance to a building, the number of objects entering or leaving the building can be determined via a suitable evaluation. If the building comprises a garage, then e.g. one can determine the number of vehicles which enter and/or leave the garage.

The evaluation device can be adapted to generation of control parameters for controlling at least one controllable technical device, based on the evaluation of appropriate "detection variables". The manhole element can be coupled to the technical device via the transmission device. For the aforementioned example of determining that a vehicle is entering a garage, the evaluation device can be adapted, e.g., for generating a control parameter which opens up a device for blocking entry, such as a gate arm, a gate, etc., and a (another) control parameter which then repositions the blocking device. Corresponding control parameters can be transmitted via the transmission device integrated into the manhole element to a receiving device associated with the respective entry-blocking device, and there converted into corresponding control commands for an associated actuator device, e.g. a motor-driven actuator device, in the entry-blocking system, resulting in the opening (or subsequent repositioning) of the entry-blocking device. It is conceivable also to provide for control of a traffic signaling device (e.g. optical or acoustic) a traffic sample, which results in a signal (e.g. optical and/or acoustic) which is presented to a traffic participant, indicating "stop" or "go". In the particular context of the above-described example of a vehicle entering or leaving a garage, it is thus possible to provide for control of a signaling device which results in a signal (e.g. optical and/or acoustic) being presented, indicating "proceed to enter" or "proceed to exit".

To provide electric power to the electrical and electronic components integrated into the structural element, in particular the detection device and the transmission device, at least one electric energy storage device, associated with the detection device and the transmission device, may be integrated into the manhole element in an analogous manner to the integration of the detection device and the transmission device; this storage device may be adapted for powering at least the detection device and/or the transmission device. It is possible for the electric energy storage device to be provided with electric energy (namely to be charged) via cable means or in a contactless and wireless manner, in particular from outside the location where the manhole structure which accommodates the given manhole element is installed. The electric energy storage device has associated with it, e.g., an inductive or capacitive charging device. Accordingly, it is unnecessary to have physical access to the shaft structure which accommodates the manhole element, in order to supply the energy storage device with electrical energy. It is possible for the charging device and/or elements of same to be disposed at a distance from the energy storage device.

It is self-evident that the energy storage device and the charging device may be integrated into the base body analogously to the manner of integration of the detection device and (or) the transmission device.

At least one connecting element may be provided which is disposed or formed on or in an exposed surface of the base body, and is coupled to a transmission device integrated with the base body, and/or is coupled to a detection device integrated with the base body, and/or is coupled to an evaluation device integrated with the base body, and/or is coupled to an energy supply device integrated with the base body, and/or is coupled to a charging device integrated with the base body. The connecting element is adapted to be connected to a corresponding mating connecting element for transmission of communication signals and/or energy to said corresponding mating connecting element and/or for reception of communication signals and/or energy transmitted by a communication partner which is coupled to the corresponding mating connecting element. A suitable connection element may comprise, e.g., one or more plug elements. By these means, the manhole element can be coupled to other devices, in particular other manhole elements.

The invention further relates to a shaft structure (manhole structure). The manhole structure may form part of, e.g., a shaft system employed for disposal or supply of materials, wherein at least part of the system is disposed below ground level (or above ground level). An example of a shaft system of this general type which is disposed below ground level is a manhole structure for disposal of sewerage and/or wastewater and/or runoff water. The manhole structure is distinguished in that it is comprised of a manhole element of a type described herein, which forms at least a part of the manhole structure. All embodiments and refinements which relate to the manhole element described herein relate analogously to the manhole structure.

The invention still further relates to a transmission system for unidirectional or multidirectional transmission of communication signals to at least one communication partner, or between a plurality of communication partners. The transmission system is distinguished in that it comprises at least one manhole element of a type described herein. All embodiments and refinements which relate to the manhole element described herein relate analogously to the transmission system.

The transmission system may comprise at least two manhole elements communicating with each other for the transmission of communication signals, which manhole elements comprise (respective) parts of one or more manhole structures. The transmission system can be adapted for transmission of communication signals within a manhole structure and/or between a plurality of manhole structures.

Further advantages, features, and details of the invention will be apparent from the exemplary embodiments illustrated in the Figures.

Figure 2:
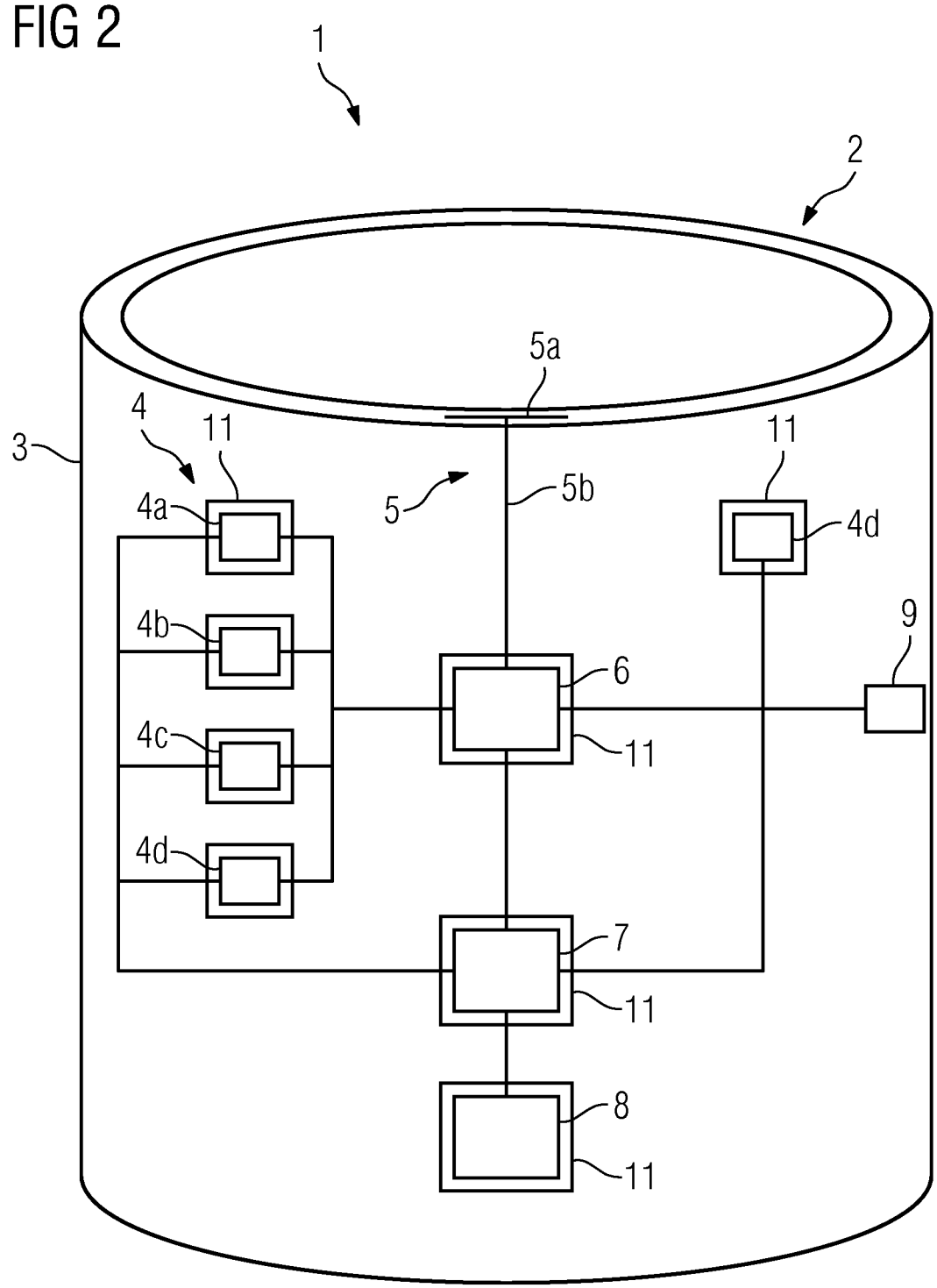
Figure 3:
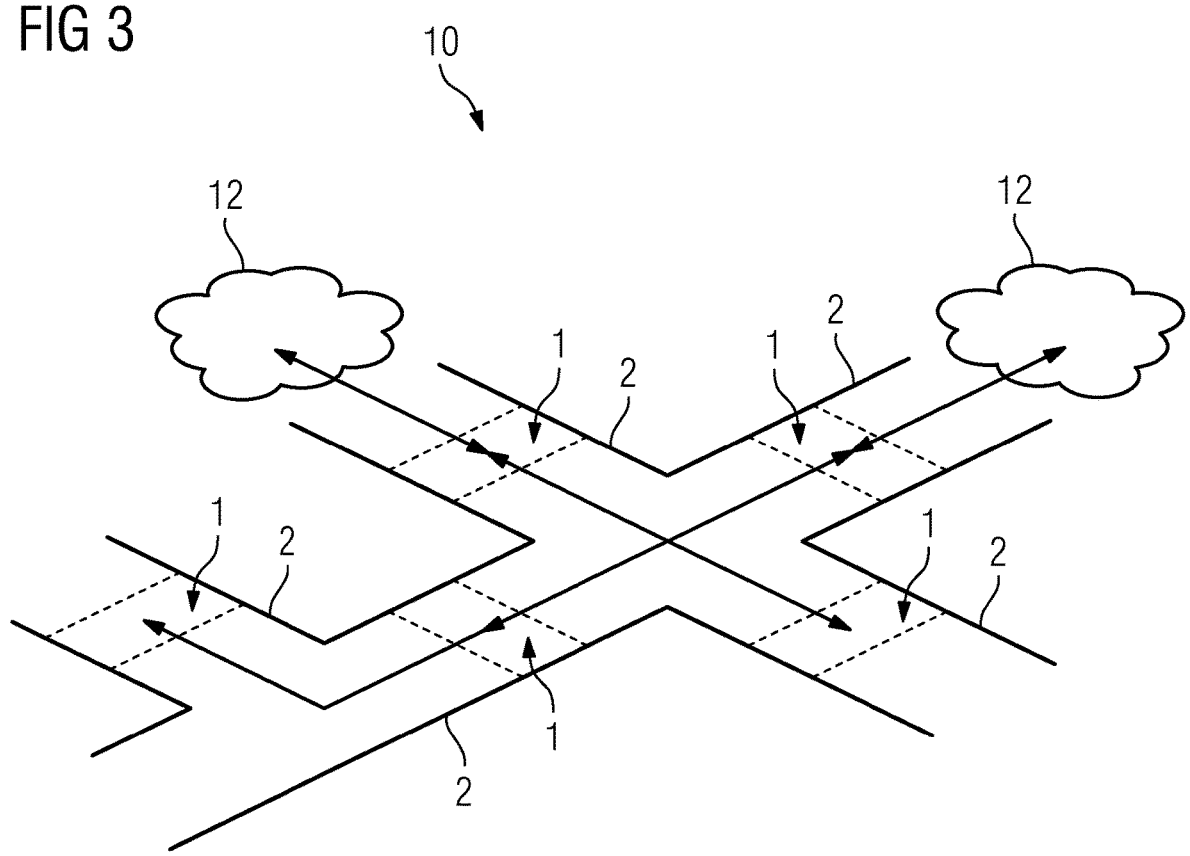

FIGS. 1 and 2 each show a schematic diagram of a manhole element (shaft element) according to a respective exemplary embodiment; and FIG. 3 shows a schematic diagram of a transmission system according to an exemplary embodiment.

FIG. 1 shows a schematic diagram of a manhole element according to a respective exemplary embodiment, in a "schematic view". The manhole element 1 is used to form a manhole structure (shaft structure) 2, which is part of a shaft system for disposal or supply of materials, e.g. a manhole structure for disposal of sewerage and/or wastewater and/or runoff water. The manhole structure 2 may be disposed or formed at least partly below (or above) ground level.

The manhole element 2 is comprised of a base body 3 which delimits a hollow space. The basic geometric shape of the base body 3 is that of a hollow cylinder; other geometric shapes of the base body are also conceivable, e.g. basic angular geometric shapes (e.g. polygonal).

The base body 3 may be comprised of a material of construction which is (optionally) curable and/or pourable, e.g. concrete, or of a plastic which in particular may be extrudable or injection-moldable, e.g. a polyolefin, e.g. PA, PC, PE, PP, or PS, and may be thermoplastic.

The base body 3 has integrated into it a detection device 4 and a corresponding transmission device 5 which is coupled to the detection device 4 for purposes of data transmission. The detection device 4 and the transmission device 5 are both disposed entirely within the wall of the base body 3 and are structurally connected to the base body 3. The structural connection may or may not be releasable, and if releasable the releasing may or may not result in damage to or destruction.

In the first case, illustrated in FIG. 1, the structural connection is not releasable. The detection device 4 and/or its associated detection elements 4a-4d, and the transmission device 5 and/or its associated transmission elements 5a, 5b are (immediately) surrounded by the material of which the base body 3 is formed; and indeed, when the base body 3 was fabricated, the detection device 4 and the transmission device 5 were encapsulated by material of which the base body 3 is formed.

In the second case, illustrated in FIG. 2, the detection device 4 and/or its associated detection elements 4a-4d, and the transmission device 5 and/or its associated transmission elements 5a, 5b are disposed in accommodation spaces 11 provided for the purpose in (or associated with) the base body 3, in particular in each instance in an exposed or exposable, thus accessible, space in the base body 3, such spaces being comprised of recesses. The accommodation spaces 11 may be disposed in a region in an inner lateral surface of the base body 3, for example. It is conceivable that accommodation spaces 11 may be disposed in a region of an outer lateral surface of the base body 3, and/or in a region of an end surface of the base body 3. It is possible to (reversibly) close off individual accommodation spaces 11 by means of, e.g., swingable closure elements (not shown). When in the closed state, the devices accommodated in the respective accommodation spaces 11 are protected from external influences; in the open state, the devices accommodated in the respective accommodation spaces 11 can be accessed.

The detection device 4 is adapted to detect (and possibly record the value of) at least one "detection variable". The "detection variable" may comprise a chemical and/or physical quantity, e.g. the composition of the atmosphere, the density, the pressure, the humidity, the pH, the temperature, etc., of:
 the manhole element 1; and/or
 a (fluid) medium disposed (and possibly flowing) in the hollow space delimited by the base body 3, or in the manhole structure 2 which accommodates the manhole element 1. For this purpose, a first measuring probe or sensor-like "detection element" 4a is provided, which may comprise, e.g., a suitable sensor system for determining the chemical composition of a (fluid) medium, e.g. a gas, disposed in the hollow space. The sensor system may comprise a sensor element which is sensitive to one or more chemical substances, e.g. methane.

For a (fluid) medium flowing in the hollow space, e.g. sewage, wastewater, or runoff water, the sensor system may (also) determine flow parameters, such as the flow rate or flow speed. For this purpose, a second measuring probe or sensor-like "detection element" 4b is provided, which may comprise, e.g., a suitable sensor system for determining the flow rate or flow speed of a (fluid) medium, e.g. sewage, wastewater, or runoff water, flowing in the hollow space. The sensor system may comprise, e.g., an optical sensor element, e.g. a camera.

A "detection variable" may also comprise a level (e.g. water level) in the hollow space, and/or in the manhole structure 2 which accommodates the manhole element 1. For this purpose, a third measuring probe or sensor-like "detection element" 4c is provided, which may comprise, e.g., a suitable sensor system for determining the liquid level in the hollow space, and/or in the manhole structure 2 which accommodates the manhole element 1. The sensor system may be comprised of, e.g., inductive or capacitive sensor elements.

Self-evidently, the above list of respective detection elements 4a-4c is presented solely for purposes of example; thus, the number of "detection elements" 4a-4c may be different than the above-stated number of "detection elements" 4a-4c, and/or the functions of the "detection elements" 4a-4c may be different than the above-described functions of the "detection elements" 4a-4c. In principle, the "detection elements" 4a-4c may detect and determine various "detection variables", such as e.g. acoustic, electrical, electromagnetic, or optical parameters.

The transmission device 5 is adapted to transmit "detection variables" detected and/or determined by the detection device 4; which "detection variables" are generally in the form of communication signals, to at least one communication partner, and to receive communication signals transmitted from at least one communication partner. A "communication partner" may be a different (mobile or stationary) transmission device (not shown), e.g. comprising a mobile telephone, smart phone, tablet computer, laptop computer, etc., and/or a global or local data network or transmission network (e.g. intranet or Internet) as indicated in FIG. 3 by reference numeral 12.

The transmission device 5 comprises transmission elements 5a, 5b (transmitting and/or receiving elements) which are adapted for transmission (sending and receiving) of communication signals.

A free end of a first transmission element 5a can extend out of an exposed region, in this case an exposed end face region, of the base body 3. Communication signals can be sent to a communication partner and/or received from a communication partner, via this transmission element 5a. The first transmission element 5a comprises an antenna. Typically, the means of transmission of the various communication signals via the first transmission element 5a are wireless means; wireless transmission means which may be considered are basically any wireless transmission means, according to various standards and protocols, examples of which are (mentioned merely for purposes of example) Bluetooth, GSM, DECT, and sub-gigahertz transmission means, modes, standards, and protocols. The communications bands employed for the transmission may comprise so-called "licensed bands" or "unlicensed bands", particularly any of the ISM bands (Industrial, Scientific and Medical Bands).

The first transmission element 5a is connected to a second transmission element 5b, which connects the first transmission element 5a to the detection device 4, i.e. to the respective "detection elements" 4a-4d. The second transmission element 5b extends through the base body 3 in a suitable manner between the first transmission element 5a and the respective "detection elements" 4a-4d.

It may be readily seen that the second transmission element 5b is not connected directly to the respective detection elements 4a-4d, but is connected via the intermediary of an evaluation device 6 which is connected into the "detection device" 4 and the transmission device 5 (and into the base body 3) in a suitable manner.

The evaluation device 6 is adapted to evaluate "detection variables" detected and recorded by the detection system comprising the detection device 4 with regard to at least one evaluation criterion, and for this purpose is comprised of evaluation algorithms programmed with regard to respective evaluation criteria.

Such an evaluation criterion may enable evaluation of "detection variables" which have been determined, for the purposes of a given shaft (manhole). The evaluation of "detection variables" which have been determined is generally in the context of specific characteristics of the manhole structure 2 or specific characteristics of a (fluid) medium disposed in (and possibly also flowing in) the manhole structure 2. E.g., the chemical composition, density, pressure, temperature, etc., of a (fluid) medium disposed in the hollow space can be evaluated with regard to certain limit values. It is also conceivable that an evaluation will involve qualitative or quantitative evaluation of the presence of certain chemical substances, e.g. as to whether the values of parameters are greater than or less than certain limit values, and in particular also whether the liquid level is greater than or less than a certain limit value.

On the other hand, a particular evaluation criterion may enable evaluation of "detection variables" which have been determined, which evaluation is not in the specific context of a given shaft (manhole). Such an evaluation may consist of evaluating "detection variables" which have been determined, with regard to specific characteristics in the region around the manhole structure 2. E.g. determinations may be made with respect to an object disposed (directly) above the manhole element 1, by means of "detection elements" 4d associated with the detection device 4, which "detection elements" may comprise elements which determine strain, or pressure, reflecting the fact that the weight of an object (the weight being represented by the arrow F) will bring about a special distribution of forces in the manhole element 1, e.g. pressure forces, i.e. will have special effects on particular ratios of forces, e.g. certain pressure forces, in the manhole element 1. Similarly, movements and movement profiles of an object, relative to the manhole element 1, can be determined, e.g. in relation to location parameters, in particular direction-dependent, and/or time-dependent, for various locations. For these purposes, advantageously a plurality of "detection elements" 4d can be disposed around the periphery, in the base body 3.

As a concrete example, traffic flow above the manhole element 1 can be determined, e.g. in relation to location parameters, in particular direction-dependent, and/or time-dependent, for various locations, in relation to specific traffic engineering parameters, e.g. particular road users, (average) traffic density, (average) traffic speed, etc., and in relation to criteria and standards applicable to these parameters. Further, the determinations can be accomplished in a short period of time. If the manhole element 1 is located in the area of an entrance to a building, the number of objects entering or leaving the building can be determined via a suitable evaluation. If the building comprises a garage, then e.g. one can determine the number of vehicles which enter and/or leave the garage.

The evaluation device 6 can be adapted to generation of control parameters for controlling at least one controllable technical device (not shown), based on the evaluation of appropriate "detection variables". The manhole element 1 can be coupled to the technical device via the transmission device 5. For the aforementioned example of determining that a vehicle is entering a garage, the evaluation device 6 can be adapted, e.g., for generating a control parameter which opens up a device which blocks entry, such as a gate arm, a gate, etc., and a (another) control parameter which then repositions the blocking device. Corresponding control parameters can be transmitted via the transmission device 5 to a receiving device associated with the respective entry-blocking device, and there converted into corresponding control commands for an associated actuator device, e.g. a motor-driven actuator device, in the entry blocking system, resulting in the opening (or subsequent repositioning) of the entry-blocking device.

To provide electric power to the electrical and electronic components integrated into the manhole element 1, an electric energy storage device 7 is integrated into the manhole element 1 in an analogous manner to the integration of the detection device 4 and the transmission device 5; this storage device 7 is adapted for powering at least the detection device 4 and the transmission device 5. It is possible for the electric energy storage device 7 to be provided with electric energy (namely to be charged) in a contactless and wireless manner, in particular from outside the location where the manhole structure 2 is installed. The electric energy storage device 7 has associated with it, e.g., an inductive or capacitive charging device 8.

A connecting element 9, e.g. in the form of a plug element, is disposed on or in an exposed surface of the base body 3; said connecting element 9 is coupled to a transmission device 5 disposed at or in the vicinity of the base body, and associated with said base body, and/or the connecting element 9 is coupled to a detection device 4 which is disposed at or in the vicinity of the base body, and which (device 4) is associated with said base body. The connecting element 9 is adapted to be connected to a corresponding mating connecting element (not shown) for transmission of communication signals to said corresponding mating connecting element and/or for reception of communication signals transmitted by a communication partner which is coupled to the corresponding mating connecting element. By these means, the manhole element 1 can be coupled to other devices, in particular other manhole elements 1.

FIG. 3 shows a schematic diagram of a transmission system 10 according to an exemplary embodiment. The transmission system 10 is used for unidirectional or multidirectional transmission of communication signals to at least one communication partner. The transmission is indicated by the "double arrows". As is seen, the transmission system 10 is comprised of a plurality of manhole elements 1 communicating with each other for the transmission of communication signals, with the manhole elements 1 comprising (respective) parts of a plurality of manhole structures 2. The transmission system 10 is adapted for transmission of communication signals within a manhole structure 2 and/or between a plurality of manhole structures 2. Self-evidently, the transmission system 10 is also adapted for transmission of communication signals to a local or global communication network, e.g. the Internet 12.

The invention claimed is:

1. A transmission system for transmitting communication signals to at least one communication partner; wherein the system is comprised of at least two underground manhole shaft elements forming least two manhole shaft structures, wherein the at least two manhole shaft elements are configured to wirelessly communicate with each other for transmission of communication signals, wherein each of the at least two manhole shaft elements is comprised of a hollow-cylindrical base body having at least one wall circumferentially surrounding a hollow manhole volume; wherein at least one detection device, which is configured to detect and determine at least one detection variable, as well as an associated transmission device, which is configured to transmit the at least one detection variable acquired by the at least one detection device to the at least one communication partner, are completely embedded in the at least one wall of the base body so as to be protected from external influences, or are completely arranged or formed in at least one accommodation space within the base body so as to be protected from external influences.

2. The transmission system according to claim 1, wherein the transmission device is also configured to receive communication signals from the at least one communication partner.

3. The transmission system according to claim 1, wherein the at least one detection device is configured to determine the at least one detection variable, and wherein the at least one detection variable is selected from:
   a chemical or physical variable selected from one or more of a density, a pressure, a humidity, a pH, or a temperature, within the manhole shaft or of a medium flowing within the hollow space delimited by the base body;
   a flow parameter of the medium flowing within the hollow space delimited by the base body, or
   a level of the medium flowing within the hollow space delimited by the base body.

4. The transmission system according to claim 1, further comprising an evaluation device associated with the at least one detection device, which evaluation device is optionally integrated into the material of the least one wall, and which is designed for evaluating the at least one detection variable determined by the at least one detection device, in connection with at least one evaluation criterion.

5. The transmission system according to claim 4, wherein the evaluation device is configured to generate control parameters for controlling at least one external device, based on the at least one detection variable which is evaluated in connection with at least one evaluation criterion.

6. The transmission system according to claim 1, further comprising an energy storage device associated with the at least one detection device or the associated transmission device, the energy storage device being used to supply electricity to the at least one detection device or the associated transmission device.

7. The transmission system according to claim 1, wherein the at least one detection device and the associated transmission device and an evaluation device and an energy storage device are integrated into the base body and are releasable or unreleasable from the base body.

8. The transmission system according to claim 1, wherein the base body is comprised of concrete, a metal, a plastic material, or a selected combination of two or more of the concrete, the metal, or the plastic material.

9. The transmission system according to claim 1, wherein the at least two manhole shaft elements are configured to wirelessly intercommunicate for transmission of communication signals between two or more of the at least two manhole shaft elements, within one of the at least two manhole shaft structures, or between two or more of the at least two manhole shaft structures.

* * * * *